US012612537B2

(12) United States Patent
Katakura et al.

(10) Patent No.: US 12,612,537 B2
(45) Date of Patent: Apr. 28, 2026

(54) THERMOSETTING ADHESIVE SHEET AND SUB-GASKET FOR FUEL CELL

(71) Applicants: Higashiyama Film Co., Ltd., Nagoya (JP); Honda Motor Co., Ltd., Tokyo (JP)

(72) Inventors: Akira Katakura, Mizunami (JP); Satoshi Aoki, Haga-machi (JP); Takuma Yamawaki, Haga-machi (JP); Masaru Oda, Haga-machi (JP); Satoru Terada, Haga-machi (JP)

(73) Assignees: HIGASHIYAMA FILM CO., LTD., Nagoya (JP); HONDA MOTOR CO., LTD., Tokyo (JP)

( * ) Notice: Subject to any disclaimer, the term of this patent is extended or adjusted under 35 U.S.C. 154(b) by 233 days.

(21) Appl. No.: 18/281,656

(22) PCT Filed: Feb. 21, 2023

(86) PCT No.: PCT/JP2023/006160
§ 371 (c)(1),
(2) Date: Sep. 12, 2023

(87) PCT Pub. No.: WO2023/167052
PCT Pub. Date: Sep. 7, 2023

(65) Prior Publication Data
US 2024/0158668 A1 May 16, 2024

(30) Foreign Application Priority Data
Mar. 1, 2022 (JP) ................................. 2022-031205

(51) Int. Cl.
| | |
|---|---|
| *C09J 7/35* | (2018.01) |
| *C09J 7/25* | (2018.01) |
| *C09J 175/04* | (2006.01) |
| *H01M 8/0284* | (2016.01) |

(52) U.S. Cl.
CPC ................. *C09J 7/255* (2018.01); *C09J 7/35* (2018.01); *C09J 175/04* (2013.01); *H01M 8/0284* (2013.01); *Y10T 428/2896* (2015.01)

(58) Field of Classification Search
None
See application file for complete search history.

(56) References Cited

U.S. PATENT DOCUMENTS

| | | | |
|---|---|---|---|
| 2006/0127738 A1* | 6/2006 | Sompalli | H01M 4/8878 |
| | | | 429/510 |
| 2009/0148640 A1* | 6/2009 | Yoshida | C08G 18/4238 |
| | | | 428/424.2 |
| 2011/0171890 A1 | 7/2011 | Nakayama et al. | |

| | | |
|---|---|---|
| 2017/0335026 A1 | 11/2017 | Motoike |
| 2021/0036338 A1 | 2/2021 | Ebato et al. |
| 2021/0277287 A1 | 9/2021 | Aoike et al. |
| 2022/0293971 A1 | 9/2022 | Kuragaki et al. |

FOREIGN PATENT DOCUMENTS

| | | |
|---|---|---|
| JP | 2007-262260 A | 10/2007 |
| JP | 2014-51621 A | 3/2014 |
| JP | 2015-17237 A | 1/2015 |
| JP | 2020-164635 A | 10/2020 |
| JP | 2021-27029 A | 2/2021 |
| JP | 2021-91863 A | 6/2021 |
| WO | 2010-016486 A1 | 2/2010 |
| WO | 2016/080409 A1 | 5/2016 |
| WO | 2019/216402 A1 | 11/2019 |
| WO | 2021/044940 A1 | 3/2021 |

OTHER PUBLICATIONS

Machine translation Takeshi et al. JP201084005A, Apr. 15, 2010 (Year: 2010).*
Information Statement filed by a third party on Aug. 19, 2024, in counterpart JP Application No. 2023-544075, with English translation. (14 pages.).
A certificate of experimental results to deny the patentability of the present invention filed by a third party dated Oct. 15, 2024, issued in counterpart Application No. 2023-544075, with English translation. (10 pages).
A certificate of experimental results to deny the patentability of the present invention filed by a third party dated Nov. 7, 2024, issued in counterpart Application No. 2023-544075, with English translation. (10 pages).
International Search Report dated May 16, 2023, issued in counterpart International Application No. PCT/JP2023/006160. (2 pages).
Information Statement filed by a third party on Mar. 21, 2024, in counterpart JP application No. 2023-544075, with English translation (10 pages).
Eisuke Yamada, Dynamic Viscoelastic Behavior of Polyurethanes, Journal of the Society of Rubber Science and Technology Japan, vol. 74, No. 6 (2001), pp. 52-58; w/machine translation; Information Statement filed by a third party dated May 21, 2024.

(Continued)

*Primary Examiner* — Anish P Desai
(74) *Attorney, Agent, or Firm* — WHDA, LLP

(57) ABSTRACT

A thermosetting adhesive sheet 10 for sealing the periphery of a membrane electrode assembly, which is composed of a solid polymer electrolyte membrane and electrodes placed on both sides of the solid polymer electrolyte membrane contains an adhesive layer 14. The adhesive layer 14 is formed of a cured product of an adhesive composition containing a polyurethane resin having a reactive functional group and a cross-linking agent, where the adhesive layer 14 has a gel fraction of 60 mass % or higher, a storage elastic modulus at 100° C. $(G'_{100})$ of $5.0{\times}10^4$ Pa or higher and $1.0{\times}10^8$ Pa or lower, and a decreasing rate of a storage elastic modulus at 120° C. $(G'_{120})$ to the storage elastic modulus at 100° C. $(G'_{100})$ of 0.5 or less.

7 Claims, 1 Drawing Sheet

(56) References Cited

OTHER PUBLICATIONS

Ken Kojio; Rheology Measurement and Polyurethane Elastomer, Seikei Kakou, vol. 30, No. 4 (2018), pp. 138-141; w/ machine translation; Information Statement filed by a third party dated May 21, 2024.

Information Statement filed by a third party on May 27, 2024, in counterpart JP application No. 2023-544075, with English translation (9 pages).

Dynamic Viscoelasticity Measurements and Data Interpretation Cases, pp. 92-106; w/machine translation; Information Statement filed by a third party dated May 27, 2024.

* cited by examiner

THERMOSETTING ADHESIVE SHEET AND SUB-GASKET FOR FUEL CELL

TECHNICAL FIELD

The present invention relates to a thermosetting adhesive sheet for sealing the periphery of a membrane electrode assembly (MEA), which is composed of a solid polymer electrolyte membrane and electrodes placed on both sides of the solid polymer electrolyte membrane, for a fuel cell, and to such a sub-gasket.

BACKGROUND ART

In recent years, fuel cells have obtained high expectations to be a tool for suppressing global warming and environmental destruction and be a next-generation power generation system. Accordingly, research and development of fuel cells are actively conducted. A fuel cell generates energy from an electrochemical reaction between hydrogen and oxygen. Examples of fuel cells include phosphoric acid fuel cells, molten carbonate fuel cells, solid electrolyte fuel cells, and polymer electrolyte fuel cells. Among them, polymer electrolyte fuel cells are attracting attention as an electric power source for automobiles (two-wheeled and four-wheeled vehicles) and a portable power source, because they can be started up at room temperature, are compact, and can achieve high output.

In the polymer electrolyte fuel cell, when a fuel gas, for example, a gas containing mainly hydrogen (hereinafter also referred to as a hydrogen-containing gas) is supplied to the anode-side electrode, hydrogen is ionized on the electrode catalyst, and the ionized hydrogen moves to the cathode-side electrode through the solid polymer electrolyte membrane. The electrons generated at the anode-side electrode are extracted to an external circuit and used as DC electric energy. Further, to the cathode-side electrode, an oxidant gas, for example, a gas containing mainly oxygen, or air (hereinafter also referred to as oxygen-containing gas) is supplied, and water is produced by a reaction of hydrogen ions and oxygen molecules that have accepted electrons.

The fuel cell has a stack structure in which a multitude of cells are stacked up. The cell stack consists of a membrane electrode assembly (MEA) composed of an electrolyte membrane and electrodes, a separator for holding the MEA, and a sealing material (gasket or sub-gasket) for sealing the peripheries of electrode members and the space between adjacent separators. As a sealing material, hot melt adhesives as disclosed in Patent Literature 1 are known, for example. As a sealing material other than the hot-melt adhesives, Patent Literature 2 discloses an adhesive sheet made of an adhesive resin composition containing a crystalline polyester resin and an amorphous polyester resin, for example.

CITATION LIST

Patent Literature

Patent Literature 1: WO 2019/216402 A1.
Patent Literature 2: JP 2015-017237 A.

SUMMARY OF INVENTION

Technical Problem

When the fuel cells are activated, the sealing materials, such as adhesive sheets, are exposed to a high-temperature and high-humidity environment. The sealing materials should maintain a high sealing performance even in such an environment. Furthermore, when a cell stack is formed with predetermined portions of the MEA sealed with an adhesive sheet, the adhesive sheet should be easy to handle and operate for adhesion. However, the sealing material of Patent Literature 1 is a hot-melt adhesive, and thus it requires pressing at a high temperature in the step of adhesion to the MEA. Thus, it takes much time for the adhesion operation, and the MEA may suffer thermal damage during the adhesion operation. On the other hand, the adhesive sheet of Patent Literature 2 can be adhered at a low temperature; however, it usually requires storage and transportation at a low temperature to maintain an uncured or semi-cured state during the period after the sheet is formed and before the start of the step of adhesion. Further, a step of performing a hardening process such as a heat process or aging is required after the adhesion step.

An object of the invention is to provide a thermosetting adhesive sheet that can be stored at room temperature, can be adhered without a curing treatment process after thermo-compression bonding, and can suppress, after adhesion, adhesion failures such as floating, peeling, and a void even in a high-temperature and high-humidity environment, and to provide such sub-gasket for fuel cells.

Solution to Problem

In order to solve the above problems, a thermosetting adhesive sheet according to the present invention is provided for sealing a periphery of a membrane electrode assembly, which is composed of a solid polymer electrolyte membrane and electrodes placed on both sides of the solid polymer electrolyte membrane, for a fuel cell, the thermosetting adhesive sheet containing a cured product of an adhesive composition containing a polyurethane resin having a reactive functional group, and a cross-linking agent, wherein the adhesive layer has: a gel fraction of 60 mass % or higher; a storage elastic modulus at 100° C. ($G'_{100}$) of $5.0 \times 10^4$ Pa or higher and $1.0 \times 10^8$ Pa or lower; and a decreasing rate of a storage elastic modulus at 120° C. ($G'_{120}$) to the storage elastic modulus at 100° C. ($G'_{100}$) of 0.5 or less.

Herein, the adhesive layer preferably has a glass transition temperature of −10° C. or higher and 100° C. or lower. Further, the adhesive layer preferably has a glass transition temperature of 50° C. or higher. The reactive functional group preferably contains a carboxyl group, and the cross-linking agent contains a multifunctional epoxy cross-linking agent. A ratio (b/a) of molar amount (a) of the carboxyl group of the polyurethane resin to molar amount (b) of the epoxy group of the epoxy cross-linking agent is preferably 1.0 or higher and 10.0 or lower.

It is preferable that the adhesive layer is formed on one surface of a base film, and the base film is made of at least one resin material selected from a group consisting of polyethylene terephthalate, polyethylene naphthalate, polyamide, polyimide, polyphenylene sulfide, polysulfone, polyethersulfone, polyetheretherketone, and polyarylate. The thermosetting adhesive sheet preferably contains a second base film on a surface of the adhesive layer opposite to the surface on which the base film is provided, wherein the second base film is made of at least one resin material selected from a group consisting of polyethylene terephthalate, polyethylene naphthalate, polyamide, polyimide, polyphenylene sulfide, polysulfone, polyethersulfone, polyetheretherketone, and polyarylate.

A sub-gasket for a fuel cell according to the present invention contains the above-described thermosetting adhesive sheet having the adhesive layer formed on one surface of the base film.

Advantageous Effects of Invention

The thermosetting adhesive sheet according to the present invention contains an adhesive layer having certain components and physical properties as described above, so that it shows excellent storage stability, can be adhered without a curing treatment process after thermo-compression bonding, and can suppress adhesion failures such as floating, peeling, and a void even in a high-temperature and high-humidity environment. Accordingly, the thermosetting adhesive sheet can be favorably used as a sealing material for a fuel cell.

When the adhesive layer has a glass transition temperature of −10° C. or higher and 100° C. or lower, the adhesiveness of the adhesive layer is excellent, and adhesion failures such as floating, peeling, and a void in a high-temperature and high-humidity environment can be effectively suppressed. In addition, a foreign substance attached to the adhesive layer can be easily removed. Further, when the adhesive layer has a glass transition temperature of 50° C. or higher, it can easily maintain excellent adhesiveness even under a high-temperature and high-humidity condition.

When the reactive functional group contains a carboxyl group, and the cross-linking agent contains a multifunctional epoxy cross-linking agent, the reactivity of the polyurethane resin with the cross-linking agent is higher.

When a ratio (b/a) of molar amount (a) of the carboxyl group of the polyurethane resin to molar amount (b) of the epoxy group of the epoxy cross-linking agent is 1.0 or higher and 10.0 or lower, the adhesive layer has high cross-linking density, and a preferable storage elastic modulus is easily achieved. In addition, the adhesion of the adhesive layer to an adherend is enhanced.

When the adhesive layer is formed on one surface of the base film, and when the base film is made of the aforementioned certain resin material, the handleability of the thermosetting adhesive sheet is improved, and a step of placing on the MEA, for example, can be performed easily.

When the thermosetting adhesive sheet further contains a second base film on a surface of the adhesive layer opposite to the surface on which the base film is provided, and when the second base film is made of the aforementioned certain resin material, the both surfaces of the adhesive sheet are covered with the base film and the second base film respectively, and thus handle ability of the thermosetting adhesive sheet is particularly improved. Even if a foreign substance is attached to the sheet, it can be easily removed.

A sub-gasket for a fuel cell according to the present invention contains the thermosetting adhesive sheet in which the adhesive layer is formed on one surface of the base film. Since the adhesive layer contained in the thermosetting adhesive sheet has certain components and physical properties, the sub-gasket for a fuel cell shows excellent storage stability, can be adhered without a curing treatment process after thermos-compression bonding, and can suppress adhesion failures such as floating, peeling, and avoid even in a high-temperature and high-humidity environment.

DESCRIPTION OF EMBODIMENTS

Next, a thermosetting adhesive sheet and a sub-gasket for a fuel cell according to embodiments of the present invention will be described. Hereinafter, unless otherwise specified, various physical property values are measured at room temperature (about 23° C.) in the atmosphere.

<Configuration of Thermosetting Adhesive Sheet>

Figure 1:
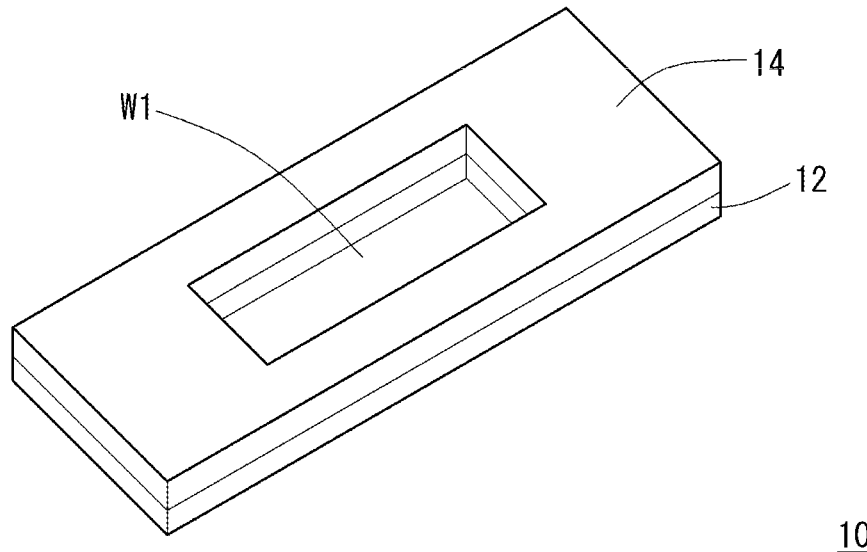
FIG. 1 is a perspective view of a thermosetting adhesive sheet according to a first embodiment of the present invention.

FIG. 1 is a perspective view of a thermosetting adhesive sheet 10 (hereinafter, simply also referred to as an adhesive sheet) according to a first embodiment of the present invention. As illustrated in FIG. 1, the adhesive sheet 10 according to the first embodiment of the present invention contains a base film 12 and an adhesive layer 14 formed on the surface of the base film 12. The adhesive layer 14 is exposed on the outermost surface of the entire adhesive sheet 10. The adhesive sheet 10 has an opening W1 at its center part as a through-hole region. The adhesive sheet 10 is used as a sealing material along with a membrane electrode assembly (MEA), which is composed of an electrolyte membrane and electrodes placed on both sides of the electrolyte membrane, for sealing the periphery of the MEA.

<Base Film>

The specific configuration of the base film 12 is not particularly limited. Examples of the base film 12 include a polymer film and a glass film. The thickness of the base film 12 is preferably, but not limited to, in the range of 12 μm or larger and 500 μm or smaller from the viewpoint of handleability. The thickness of the base film 12 is more preferably 38 μm or larger or 50 μm or larger. On the other hand, the thickness of the base film 12 is preferably 200 μm or smaller or 100 μm or smaller. Generally, the term "film" refers to a film having a thickness of smaller than 0.25 mm; however, herein a film having a thickness of 0.25 mm or larger will also be considered as "film" as long as it has flexibility.

When the base film 12 is a polymer film, examples of the polymer material constituting the base film 12 includes polyester resin such as polyethylene terephthalate resin, polybutylene terephthalate resin, polyethylene naphthalate resin, and liquid crystalline polyester; polycarbonate resin; poly (meth) acrylate resin; polystyrene resin; polyamide resin; polyphthalamide resin; polyimide resin; polyacrylonitrile resin; polyolefin resin such as polypropylene resin, polyethylene resin, polycyclo-olefin resin, and cyclo-olefin copolymer resin; polyphenylene sulfide resin; polyvinyl chloride resin; polyvinylidene chloride resin; polyvinyl alcohol resin; polyvinylidene fluoride resin; fluoroethylene resin; silicone resin; polysulfone resin; polyethersulfone resin, polyetheretherketone resin; and polyarylate resin. The polymer material of the base film 12 may be composed of only one of these materials, or may be composed of a combination of two or more of those in a stacked manner, for example. Among these, resins of polyethylene terephthalate, polyethylene naphthalate, polyamide, polyimide, polyphenylene sulfide, polysulfone, polyethersulfone, polyetheretherketone, and polyarylate are preferred from the viewpoint of heat resistance, mechanical properties, and the like. The base film 12 is preferably made of at least one resin material selected from the group consisting of these resins.

The base film 12 may be formed as a single-layer film containing one or more of the above polymer materials, or may be formed as a multilayer film of a layer containing one or more of the above polymer materials and a layer containing another one or more of the above polymer materials, for example.

<Adhesive Layer>

The adhesive layer 14 contains a cured product of an adhesive composition containing a polyurethane resin having a reactive functional group and a cross-linking agent. The adhesive composition has a thermosetting property. The adhesive sheet 10 containing the adhesive layer 14 functions as a thermosetting adhesive sheet. In the adhesive sheet 10 before use, the adhesive layer 14 has been cured with some uncured materials remaining (semi-cured state). When the adhesive sheet 10 is adhered to an adherend, further curing by heating is performed for the adhesive layer 14, thereby allowing the adhesive sheet 10 to function as a thermosetting adhesive sheet. Herein, the concept of adhesiveness also includes the concept of stickiness, which is to say, pressure-sensitive adhesiveness.

(Properties of Adhesive Layer)

The thickness of the adhesive layer 14 is preferably 1 μm or larger, more preferably 5 μm or larger, from the viewpoint of ensuring adhesiveness. On the other hand, the thickness of the adhesive layer 14 is preferably 50 μm or smaller, more preferably 25 μm or smaller, from the viewpoint of reducing the size of the fuel cell.

The adhesive layer 14 has a gel fraction of 60 mass % or higher. When the gel fraction is 60 mass % or higher, the adhesion, in the adhesion step to the MEA, can be completed without a curing treatment step after thermo-compression bonding. Further, the adhesive layer 14 exhibits excellent storage stability, and can suppress adhesion failures such as lifting, peeling, and a void even in a high-temperature and high-humidity environment. Furthermore, the adhesive layer 14 can be stably stored at room temperature without requiring storage at a low temperature to maintain the uncured or semi-cured state until the start of the adhesion step. The gel fraction is preferably 65 mass % or higher, more preferably 70 mass % or higher, still more preferably 80 mass % or higher, while the upper limit of the gel fraction is 100 mass %.

The adhesive layer 14 has a shear storage modulus at 100° C. ($G'_{100}$) of $5.0 \times 10^4$ Pa or higher. When the shear storage modulus is $5.0 \times 10^4$ Pa or higher, the adhesive layer 14 is moderately cured even before thermos-compression bonding, so that adhesion can be completed by short-pressure bonding. From the viewpoint of further enhancing this effect, $G'_{100}$ is preferably $7.0 \times 10^4$ Pa or higher, more preferably $1.0 \times 10^5$ Pa or higher. On the other hand, $G'_{100}$ should be $1.0 \times 10^8$ Pa or lower. When the shear storage modulus is $1.0 \times 10^8$ Pa or lower, the adhesive layer 14 can sustain elasticity even at a high temperature, leading to obtainment of excellent adhesiveness. It is more preferable that $G'_{100}$ is $1.0 \times 10^7$ Pa or lower, still more preferably $5.0 \times 10^6$ Pa or lower.

The adhesive layer 14A has a decreasing rate of the storage elastic modulus at 120° C. ($G'_{120}$) to the storage elastic modulus at 100° C. ($G'_{100}$) of 0.5 or less. When the decreasing rate is 0.5 or less, even if the adhesive layer 14 is placed in a high-temperature and high-humidity environment, adhesion failures such as lifting, peeling, and avoid can be suppressed. From the viewpoint of further enhancing this effect, the decreasing rate is preferably 0.48 or less, more preferably 0.45 or less, and further preferably 0.3 or less. The lower limit of the decreasing rate is typically, but not limited to, −0.1 or more, and preferably 0 or more. The decreasing rate is obtained by the formula, $(G'_{100} - G'_{120})/G'_{100}$.

The adhesive layer 14 preferably has a shear storage modulus at 120° C. ($G'_{120}$) of $5.0 \times 10^4$ Pa or higher. When the shear storage modulus is $5.0 \times 10^4$ Pa or higher, adhesion strength is easily maintained even in a high-temperature environment, so that high moist heat resistance can be obtained. From the viewpoint of further enhancing this effect, $G'_{120}$ is preferably $7.0 \times 10^4$ Pa or higher, more preferably $1.0 \times 10^5$ Pa or higher. On the other hand, $G'_{120}$ is preferably $1.0 \times 10^8$ Pa or lower. When the shear storage modulus is $1.0 \times 10^8$ Pa or lower, the adhesive layer 14 can maintain elasticity even at a high temperature, leading to obtainment of excellent adhesiveness. It is more preferable that $G'_{120}$ is $1.0 \times 10^7$ Pa or lower, still more preferably $5.0 \times 10^6$ Pa or lower.

The adhesive layer 14 preferably has a glass transition temperature of −10° C. or higher. When the glass transition temperature is −10° C. or higher, adhesion failures such as floating, peeling, and a void can be effectively suppressed even in a high-temperature and high-humidity environment, and a foreign substance attached to the adhesive layer 14 can be easily removed. From the viewpoints of these, the glass transition temperature is more preferably −8° C. or higher, still more preferably −5° C. or higher, and particularly preferably 50° C. or higher from the viewpoint of maintaining high adhesiveness even under a high-temperature and high-humidity condition. On the other hand, the glass transition temperature is preferably 100° C. or lower. When the glass transition temperature is 100° C. or lower, the adhesive layer 14 shows excellent adhesiveness to the MEA. From the viewpoint of this, the glass transition temperature is more preferably 95° C. or lower, and still more preferably 90° C. or lower.

The adhesive layer 14A preferably has an adhesive strength to the base film 12 and to the MEA at 23° C. of 1 N/25 mm or higher, more preferably 1.2 N/25 mm or higher, and still more preferably 2 N/25 mm or higher. When the adhesive strength is 1 N/25 mm or higher, lifting or peeling of the adhesive layer 14 is favorably suppressed. The upper limit of the adhesive strength is typically, but not limited to, 50 N/25 mm or lower, and preferably 40 N/25 mm or lower. Evaluation of the adhesive strength of the adhesive layer 14 may be performed by the same method as a measurement method of "initial release force" in Examples described later.

(Polyurethane Resin)

As described above, the adhesive composition contained in the adhesive layer 14 contains a polyurethane resin having a reactive functional group. The presence of the polyurethane resin allows the adhesive layer 14 to obtain appropriate flexibility and moist heat resistance and enables the completion of adhesion through short thermos-compression bonding. Polyurethane resin is a general term for compounds with two or more urethane bonds in one molecule. Polyurethane resins have a structure in which polyisocyanate and polyol are polymerized.

The polyisocyanate should have two or more isocyanate groups in one molecule, and diisocyanate or triisocyanate, particularly diisocyanate, is preferred from the viewpoint of the physical properties of the adhesive layer 14. The diisocyanate can be appropriately selected for use from among aliphatic diisocyanates such as hexamethylene diisocyanate, and aromatic diisocyanates such as benzene-1,3-diisocyanate in consideration of the physical properties of the adhesive layer 14. The polyisocyanates can be used alone or in combination of two or more of them. An isocyanate group-terminated prepolymer obtained by reacting polyol with excess polyisocyanate may be used as an intermediate for the polyurethane resin.

The polyol should have two or more hydroxyl groups in one molecule, and diol or triol, particularly diol, is preferred from the viewpoint of the physical properties of the adhesive layer 14. The diol can be appropriately selected for use from among aliphatic diols such as ethylene glycol and aromatic diols such as benzenediol in consideration of the physical properties of the adhesive layer 14. The polyols can be used alone or in combination of two or more of them. Prepolymers such as polyether polyol, polyester polyol, and polycarbonate polyol may also be used.

The polyurethane resin may be a polyurethane urea resin having a urea bond further. The polyurethane urea resin has, for example, a structure in which polyamine is bonded to a urethane resin having an isocyanate group at its end. The polyamine should have two or more amino groups in one molecule, and diamine or triamine, particularly diamine, is preferred from the viewpoint of the physical properties of the adhesive layer 14. The diamine can be appropriately selected for use from among known aliphatic diamines such as ethylenediamine and known aromatic diamines such as phenylenediamine in consideration of the physical properties of the adhesive layer 14. The polyamines can be used alone or in combination of two or more of them.

The polyurethane resin preferably has a weight average molecular weight (Mw) of 5,000 or larger, more preferably 10,000 or larger, and still more preferably 50,000 or larger. On the other hand, the average molecular weight should preferably be 1,000,000 or smaller, more preferably 500,000 or smaller, and still more preferably 200,000 or smaller. When the average molecular weight is 5,000 or larger, the moist heat resistance of the adhesive layer 14 can be improved, and when the average molecular weight is 1,000,000 or smaller, the coating workability of the adhesive composition is improved.

Although the reactive functional group of the polyurethane resin is not limited as long as it is a functional group capable of undergoing chemical reaction with a cross-linking agent to form bonding, examples of the reactive functional group include hydroxyl groups, phenolic hydroxyl groups, methoxymethyl groups, carboxy groups, amino groups, epoxy groups, oxetanyl groups, oxazoline groups, oxazine groups, aziridine groups, thiol groups, isocyanate groups, blocked isocyanate groups, blocked carboxyl groups, and silanol groups. The polyurethane resin may contain one or at least two of these reactive functional groups. Among these, the hydroxyl groups, the carboxy groups, the amino groups, and the epoxy groups are preferred, and the carboxy groups are particularly preferred from the viewpoint of availability and reactivity with a cross-linking agent. In the polyurethane resin, the reactive functional group may be directly bonded to the polyurethane chain, such as a polyol moiety, or may be introduced into a side chain bonded to the polyurethane chain.

When the polyurethane resin has a carboxyl group, the acid value of the polyurethane resin is preferably 4.0 mgKOH/g or higher and 40 mgKOH/g or lower. When the polyurethane resin has an acid value of within the aforementioned range, the cross-linking density with the cross-linking agent can be optimized, and the storage elastic modulus and loss tangent of the adhesive layer 14 at 100° C. and 120° C. can be readily kept within the appropriate ranges respectively. The acid value is more preferably 6.0 mgKOH/g or higher, and still more preferably 8.0 mgKOH/g or higher. On the other hand, the acid value is more preferably 30 mgKOH/g or lower, and still more preferably 20 mgKOH/g or lower.

(Cross-Linking Agent)

As described above, the adhesive composition contained in the adhesive layer 14 contains the cross-linking agent in addition to the polyurethane resin. The cross-linking agent is a compound having two or more reactive groups per molecule which can react with the reactive functional group of the polyurethane resin and form cross-links between the molecular chains of the polyurethane resin through heating of the adhesive composition. Examples of the cross-linking agent include isocyanate-based cross-linking agents, epoxy-based cross-linking agents, aziridine-based cross-linking agents, metal chelate-based cross-linking agents, melamine resin-based cross-linking agents, and urea resin-based cross-linking agents. Among these, the epoxy-based cross-linking agents are preferred from the viewpoint of adhesiveness, heat resistance, and the like.

The epoxy-based cross-linking agents refer to compounds having two or more epoxy groups per molecule as reactive groups. The epoxy-based cross-linking agents may be used alone or in combination of two or more of them.

Examples of the epoxy-based cross-linking agents include bisphenol A type epoxy resin, epichlorohydrin type epoxy resin, ethylene glycidyl ether, N,N,N',N'-tetrakis(2,3-epoxypropyl)-1,4-phenylenediamine, N,N,N',N'-tetrakis(oxiran-2-ylmethyl)-4,4'-methylenebisaniline, N,N-diglycidyl-4-(glycidyloxy)aniline, N,N,N',N'-tetraglycidyl-m-xylylenediamine, 1,1,2,2-tetrakis(3-glycidyloxyphenyl)ethane, diglycidylaniline, diamine glycidylamine, 1,3-bis(N,N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, glycerin diglycidyl ether, glycerin triglycidyl ether, polyglycerol polyglycidyl ether, sorbitan polyglycidyl ether, trimethylolpropane polyglycidyl ether, adipic acid diglycidyl ester, o-phthalic acid diglycidyl ester, triglycidyl-tris(2-hydroxyethyl) isocyanurate, resorcinol diglycidyl ether, and bisphenol-S-diglycidyl ether. Among these epoxy-based cross-linking agents, multifunctional epoxy cross-linking agents having three to five epoxy groups per molecule are preferred from the viewpoint of high adhesiveness and heat resistance.

The cross-linking agent contained in the adhesive composition is preferably a liquid with a viscosity at 25° C. of 500 mPa·s or higher or a solid with a softening point of 100° C. or lower. The molecular weight of the cross-linking agent contained in the adhesive composition is preferably 200 or larger, more preferably 400 or larger, and still more preferably 600 or larger. On the other hand, the molecular weight is preferably 10,000 or smaller, more preferably 5,000 or smaller, and still more preferably 1,000 or smaller. The functional group equivalent weight (epoxy equivalent weight for the epoxy-based cross-linking agent) of the reactive group of the cross-linking agent contained in the adhesive composition is preferably 50 g/eq or larger, more preferably 100 g/eq or larger, and still more preferably 150 g/eq or larger. On the other hand, the functional group equivalent weight is preferably 1000 g/eq or smaller, more preferably 600 g/eq or smaller, still more preferably 400 g/eq or smaller, and particularly preferably 250 g/eq. When the molecular weight and reactive group content of the cross-linking agent fall within the respective ranges, excellent adhesiveness to the MEA and excellent moist heat resistance can be achieved.

The content of the cross-linking agent contained in the adhesive composition is preferably 0.1 parts by mass or more, more preferably 0.5 parts by mass or more, still more preferably 5 parts by mass or more, and particularly preferably 10 parts by mass or more, with respect to 100 parts by mass of the polyurethane resin. On the other hand, the content of the cross-linking agent contained in the adhesive composition is preferably 30 parts by mass or less, more preferably 25 parts by mass or less, and still more preferably 20 parts by mass or less. When the content of the cross-linking agent (B) falls within the above range, excellent adhesiveness to the MEA and excellent moist heat resistance can be obtained.

The ratio (b/a) of the molar amount (a) of the reactive functional groups of the polyurethane resin, such as carboxyl groups, to the molar amount (b) of the reactive groups of the cross-linking agent, such as epoxy groups of the epoxy-based cross-linking agent, contained in the adhesive composition is preferably 1.0 or higher, more preferably 1.1 or higher, and still more preferably 1.3 or higher. On the other hand, the molar ratio (b/a) is preferably 10.0 or lower, more preferably 8.0 or lower, still more preferably 7.0 or lower. When the molar ratio is 1.0 or higher, a sufficient cross-linking density can be obtained, achieving a favorable storage elastic modulus. When the molar ratio is 10.0 or lower, the adhesion of the adhesive layer 14 to an adherend can be enhanced, and peeling and the like may be suppressed effectively, leading to improvement in durability.

(Other Additives)

In addition to the polyurethane resin and the cross-linking agent, other additives may be blended and used in the adhesive composition. Examples of such additives include cross-linking accelerators, cross-linking retarders, fillers, plasticizers, softeners, release aids, silane coupling agents, dyes, pigments, coloring matters, fluorescent brighteners, antistatic agents, wetting agents, surfactants, thickeners, antifungal agents, preservatives, oxygen absorbers, UV absorbers, antioxidants, near-infrared absorbers, water-soluble quenchers, fragrances, metal deactivators, nucleating agents, alkylating agents, flame retardants, lubricants, and processing aids. These are appropriately selected and blended for use according to the application or the intended use of the adhesive sheet 10, which is to say, a specific type, configuration, or use environment of the MEA to which the adhesive sheet 10 is applied.

Among the aforementioned additives, the filler is blended in the aim of improving the moist heat resistance, adjusting the modulus of elasticity, and improving removability of foreign substances on the adhesive sheet 10 upon tack-free time. The filler may be either an inorganic filler or an organic filler. Examples of the inorganic fillers include inorganic particles, such as particles of silica, alumina, calcium carbonate, talc, and clay. Examples of such resin fillers include resin particles made of (meth)acrylic resin, styrene resin, styrene-(meth)acrylic resin, urethane resin, polyamide resin, silicone resin, epoxy resin, phenol resin, polyethylene resin, and cellulose resin.

(Method for Manufacturing Adhesive Composition)

The adhesive composition can be formed by mixing a polyurethane resin, a cross-linking agent, and other additives used as necessary. The adhesive composition may be a solution to which an appropriate solvent is added and diluted to a viscosity suitable for forming the adhesive layer 14.

Examples of the solvent include aliphatic hydrocarbons such as hexane and heptane; aromatic hydrocarbons such as toluene and xylene; halogenated hydrocarbons such as methylene chloride and ethylene chloride; ketones such as acetone, methyl ethyl ketone, methyl isobutyl ketone, 2-pentanone, isophorone, and cyclohexanone; esters such as ethyl acetate, propyl acetate, isopropylacetate, and butylacetate; cellosolve solvents such as ethyl cellosolve; and alcohol-based solvents such as ethanol, isopropyl alcohol, n-butyl alcohol, ethylene glycol monomethyl ether, ethylene glycol monoisopropyl ether, propylene glycol monomethyl ether, and diethylene glycol monobutyl ether. These solvents may be used alone or in combination of two or more of them. The amount of the solvent used should be appropriately adjusted such that the adhesive composition has a viscosity suitable for coating. For example, the amount of the solvent used is, but not limited to, preferably 1 to 90 mass %, more preferably 10 to 80 mass %, and still more preferably 20 to 70 mass % from the viewpoint of coatability.

(Method for Manufacturing Adhesive Sheet)

The adhesive sheet 10 according to the present embodiment can be manufactured by (1) applying the adhesive composition directly on one surface of the base film 12 and then performing drying and curing step by performing heat treatment, followed by aging where necessary, or (2) applying the adhesive composition on a surface of a release film, performing heat treatment, and transferring the adhesive composition onto one surface of the base film 12, followed by aging where necessary. Of these, the method (1), in which the adhesive composition is applied directly onto one surface of the base film 12 to form the adhesive sheet 10, is preferred from the viewpoint of adhesion to the base materials.

Various coating methods can be used for coating the adhesive composition, such as, for example, a reverse gravure coating method, a direct gravure coating method, a die coating method, a bar coating method, a wire bar coating method, a roll coating method, a spin coating method, a dip coating method, a spray coating method, a knife coating method, and a kiss coating method. In addition, various printing methods can be used, such as, for example, an inkjet method, offset printing, screen printing, and flexographic printing. Before application of the adhesive composition, surface treatment may be applied to the surface of the base film 12 such as corona treatment, plasma treatment, hot air treatment, ozone treatment, and ultraviolet treatment. In particular, corona treatment is preferred from the viewpoint of adhesiveness of the adhesive layer 14.

Although the drying and curing step is not particularly limited as long as the solvent used in the adhesive composition can be removed and curing can be performed, the step is preferably performed at a temperature of 60 to 200° C. for 20 to 300 seconds. In particular, the drying is preferably performed at 120° C. to 130° C. The adhesive composition is preferably cured so as to leave some uncured materials (i.e., in a semi-cured state).

The aging is performed, for example, at 40° C. to 80° C. for about 3 to 20 days, preferably at 60° C. for about 4 to 7 days. By performing the drying and curing step, and the aging step, where necessary, the gel fraction of the adhesive layer 14 falls within a predetermined range, and the adhesive layer 14 can be firmly adhered to the MEA in a short adhesion step.

The adhesive sheet 10 before use may have a release sheet on the surface of the adhesive layer 14. The release sheet is used as a protective material for the adhesive layer 14 and is peeled off at the time when the adhesive sheet 14 of the present invention is attached to an adherend. Examples of the release sheet include paper such as glassine paper, coated paper, and laminated paper, and various plastic sheets coated with a release agent such as silicone resin. If the adhesive layer 14 has no adhesiveness, a sheet with at least one adhesive surface may be used. When a plastic sheet is used as the release sheet, the film exemplified as the base film 12 can be used appropriately. The thickness of the release sheet is typically, but not limited to, 10 to 150 μm.

(How to Use Adhesive Sheet)

The adhesive sheet 10 can be used as a sub-gasket for the MEA. In such case, the surface of the adhesive sheet 10 on which the adhesive layer 14 is formed is placed to be in contact with the MEA to stack the adhesive sheet 10 and the MEA. In this case, the solid electrolyte membrane of the MEA is positioned to be aligned with the opening W1 of the adhesive sheet 10. Then, by heating the adhesive sheet 10 while applying pressure into the direction of pressing the adhesive sheet 10 against the MEA, adhesion of the adhesive layer 14 to the MEA is completed. Pressure of 0.5 to 10 MPa, heating temperature of 130 to 170° C., and pressurization/heating time of 3 to 60 seconds can be exemplified. After the thermos-compression bonding step, the adhesive sheet 10 can be used for subsequent steps such as stacking of power generation cells without undergoing a curing treatment step such as heat treatment or aging.

OTHER EMBODIMENTS

Figure 2:
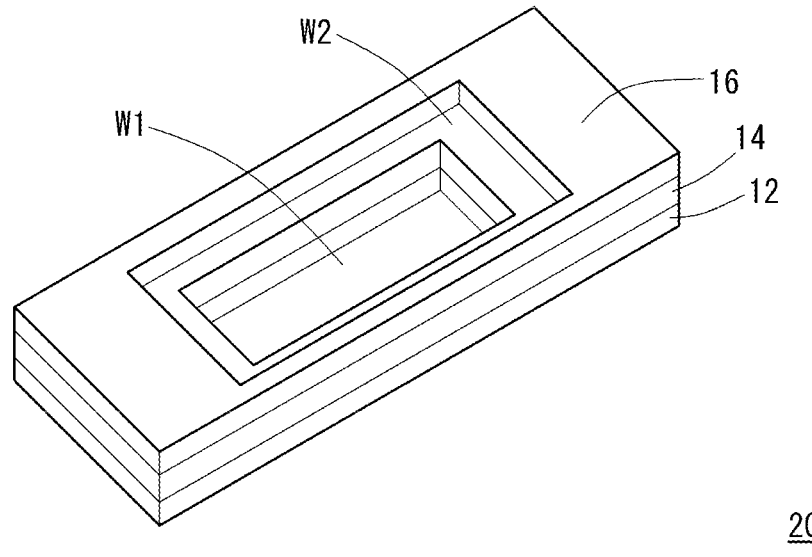
FIG. 2 is a perspective view of a thermosetting adhesive sheet according to a second embodiment of the present invention.

FIG. 2 is a perspective view of an adhesive sheet 20 according to a second embodiment of the present invention. As illustrated in FIG. 2, the adhesive sheet 20 of the second embodiment of the present invention contains a second base film 16 in addition to a base film 12, and an adhesive layer 14 formed on a surface of the base film 12. The second base film 16 is provided on a surface of the adhesive layer 14 opposite to the surface on which the base film 12 is provided. The second base film 16 covers the surface of the adhesive layer 14 at a portion of the adhesive layer 14 which is not in contact with the MEA. More specifically, the second base film 16 has an exposed opening W2 as a through hole larger than the opening W1 provided in the base film 12 and the adhesive layer 14 (containing the entire opening W1 inside). The adhesive layer 14 is partially exposed inside the exposed opening W2 at a portion surrounding the opening W1. When the portion of the adhesive layer 14 exposed inside the exposed opening W2 contacts the MEA stacked on the adhesive sheet 20, adhesion to the MEA is completed. In the adhesive sheet 20 of the present embodiment, the adhesive layer 14 is not exposed on the outermost surface in any portion other than the portion at which adhesion to the MEA is completed inside the exposure opening W2. Thus, attachment of a foreign substance to the adhesive layer 14 can be suppressed, and an attached foreign substance can be removed easily. Other configuration of the adhesive sheet 20 according to the second embodiment includes the same configuration of the adhesive sheet 10 according to the first embodiment as described above.

Similarly with the base film 12, examples of the polymer material constituting the second base film 16 includes polyester resin such as polyethylene terephthalate resin, polybutylene terephthalate resin, polyethylene naphthalate resin, and liquid crystal polyester; polycarbonate resin; poly (meth) acrylate resin; polystyrene resin; polyamide resin; polyphthalamide resin; polyimide resin; polyacrylonitrile resin; polyolefin resin such as polypropylene resin, polyethylene resin, polycyclo-olefin resin, and cyclo-olefin copolymer resin; polyphenylene sulfide resin; polyvinyl chloride resin; polyvinylidene chloride resin; polyvinyl alcohol resin; polyvinylidene fluoride resin; fluoroethylene resin; silicone resin; polysulfone resin; polyethersulfone resin; polyetheretherketone resin; and polyarylate resin. The polymer material contained in the second base film 16 may be composed of only one type of these materials, or may be composed of a combination of two or more of these materials in a stacked manner, for example.

Among these, resins of polyethylene terephthalate, polyethylene naphthalate, polyamide, polyimide, polyphenylene sulfide, polysulfone, polyethersulfone, polyetheretherketone, and polyarylate are preferred from the viewpoint of heat resistance, mechanical properties, and the like. The second base film 16 is preferably composed of at least one resin material selected from the group of these resins.

Although the adhesive layer 14 (and the second base film 16) is provided only on one surface of the base film 12 in the adhesive sheets 10,20 according to the above-described first and second embodiments; however, the adhesive layer 14 (and the second base film 16) may be provided on both surfaces of the base film 12. Although the use of the base film 12 or the second base film 16 improves handleability of the adhesive sheet and facilitates operations such as stacking with the MEA, the adhesive sheet may be made only of the adhesive layer 14 as a self-supporting adhesive membrane without using the base film 12 or the second base film 16. Furthermore, although each of the adhesive sheets 10 and 20 according to the first and second embodiments is formed as the sub-gasket with the opening W1 to be used in a stacked manner with the MEA, the adhesive sheet according to the embodiments of the present invention may not necessarily be formed as a sub-gasket, and can be formed into an appropriate shape according to applications at a portion where sealing is required in a fuel cell.

EXAMPLES

Hereunder, the present invention is now described in detail using examples and comparative examples. It should be noted that the present invention is not limited by examples. In the following, unless otherwise specified, all steps relating to the preparation and evaluation of samples were carried out at room temperature in the atmosphere.

<Preparation of Samples>

Example 1

Preparation of Adhesive Composition

An adhesive composition was prepared by adding 6.0 parts by mass (solid content) of an epoxy cross-linker <1> below (HD-901, manufactured by TOYOCHEM CO., LTD.) to 100 parts by mass (solid content) of a polyurethane resin <1> below (VA-9302, manufactured by TOYOCHEM CO., LTD.), and further adding toluene to obtain a solid concentration of 19 mass %.

Production of Adhesive Sheet

The adhesive composition was applied on one surface of a polyethylene naphthalate (PEN) film ("Teonex Q51" manufactured by TOYOBO CO., LTD.) using a baker-type film applicator so as to obtain a thickness of 10 μm after drying, and heated at 150° C. for 3 minutes. Then, the release surface of a release film ("HY-S10" manufactured by Higashiyama Film Co., Ltd., silicone-based PET release film, thickness 25 μm) was attached to a surface that was not covered with the PEN film of the adhesive composition. After that, the adhesive composition with the films was subjected to aging at 60° C. for 6 days to produce an adhesive sheet.

Examples 2 to 11, Comparative Examples 1 to 3

Each adhesive sheet was produced in the same way as in Example 1 by employing the adhesive composition and aging condition as shown in Table 1.

Materials used to produce samples of Examples 1 to 11 and comparative examples 1 to 3 are as follows.

Resin <1>: VA-9302 (manufactured by TOYOCHEM CO., LTD., polyurethane resin, solvent: toluene/isopropanol, solid concentration: 25.5 mass %, reactive functional group: carboxy group, acid value: 10 mgKOH/g).

Resin <2>: VA-9320 (manufactured by TOYOCHEM CO., LTD., polyurethane resin, solvent: toluene/isopropanol, solid concentration: 25 mass %, reactive functional group: carboxy group, acid value: 10 mgKOH/g).

Resin <3>: ARON MIGHTY AS-350 (manufactured by TOAGOSEI CO., LTD., modified epoxy resin, solvent: toluene/methanol/ethylene glycol monomethyl ether/dimethylformamide/xylene/diethylene glycol dimethyl ether, solid concentration: 30 mass %).

Resin <4>: VA-9315 (manufactured by TOYOCHEM CO., LTD., polyurethane resin, solvent: toluene/isopropanol, solid concentration: 22.0 mass %, reactive functional group: carboxy group, acid value: 10 mgKOH/g).

Resin <5>: VA-9315H1 (manufactured by TOYOCHEM CO., LTD., polyurethane resin, solvent: toluene/isopropanol, solid concentration: 22.2 mass %, reactive functional group: carboxy group, acid value: 10 mgKOH/g).

Resin <6>: VA-9315H2 (manufactured by TOYOCHEM CO., LTD., polyurethane resin, solvent: toluene/isopropanol, solid concentration: 21.3 mass %, reactive functional group: carboxy group, acid value: 10 mgKOH/g).

Cross-linking agent <1>: HD-901 (manufactured by TOYOCHEM CO., LTD., tetrafunctional epoxy resin, solvent: toluene/methyl ethyl ketone, solid concentration: 50 mass %, epoxy equivalent: 200 g/eq, softening point: 92° C.)

Cross-linking agent <2>: jER604 (manufactured by Mitsubishi Chemical Corporation, tetrafunctional epoxy resin, solid concentration: 100 mass %, epoxy equivalent: 120 g/eq, viscosity at 25° C.: 8000 mPa·s).

Cross-linking agent <3>: jER630 (manufactured by Mitsubishi Chemical Corporation, trifunctional epoxy resin, solid concentration: 100 mass %, epoxy equivalent: 98 g/eq, viscosity at 25° C.: 800 mPa·s).

Cross-linking agent <4>: TETRAD-C (manufactured by MITSUBISHI GAS CHEMICAL COMPANY, INC., tetrafunctional epoxy resin, solid concentration: 100 mass %, epoxy equivalent: 103 g/eq, viscosity at 25° C.: 2300 mPa·s).

<Evaluation Method>

(Storage Elastic Modulus, Glass Transition Temperature)

Each adhesive composition prepared was applied to a release surface of a release film and dried at 150° C. for 3 minutes. Furthermore, the step of applying the adhesive composition onto the adhesive layer and drying the applied adhesive composition at 150° C. for 3 minutes was repeated for layer stacking until a thickness of 0.5 mm was obtained. After that, aging was performed under a predetermined condition to produce a test sample. Upon the release film removed, the shear storage modulus (G') of the sample was measured at −40° C. to 150° C. using a viscoelasticity measuring device (manufactured by TA Instruments, Inc., Discovery HR-2). The measurement conditions were as follows: mode was shear mode; geometry was a parallel plate with a diameter of 8 mm; the axial force was 1.0 N; the normal load was 1.0 N; frequency was 1 Hz; and heating rate was 5° C./min.

In addition, the loss elastic modulus (G") was measured, and the temperature at which loss tangent (tan 5), which is the value (G"/G') obtained by dividing the loss elastic modulus (G") by the storage elastic modulus (G'), reaches its maximum value was set as the glass transition temperature.

Gel Fraction

The mass W1 of a wire mesh (400 mesh) cut out to have 50 mm wide and 120 mm long was measured. A test piece was produced by taking out 0.1 g of the adhesive layer from the prepared adhesive sheet and wrapping the taken-out adhesive layer with a wire mesh, and the mass W2 of the test piece was measured. The test piece was put into a glass bottle, 40 g of toluene was poured into the glass bottle, and the glass bottle with the test piece was shaken lightly and then left statically for 76 hours at room temperature (25° C.). After that, the test piece was taken out from the glass bottle, left at room temperature for 12 hours, and further dried in a vacuum oven at 100° C. for 4 hours. The dried test piece was cooled to room temperature and the mass W3 of the test piece was measured, and the gel fraction was calculated from the following formula.

$$\text{Gel fraction(mass \%)}=((W3-W1)/(W2-W1))\times 100$$

(Thickness)

The total thickness of the entire adhesive sheet was measured using a thickness measuring machine ("TH-104" manufactured by TESTER SANGYO CO., LTD.). The thickness of the adhesive layer was obtained by subtracting the thicknesses of the base film and the release film from the total thickness.

(Initial Release Force)

The release sheet of the adhesive sheet was peeled off from the adhesive layer, a solid polymer electrolyte membrane ("Nafion PFSA NR-212" manufactured by DUPONT, thickness: 50.8 μm) was overlaid on the surface of the adhesive layer and press bonded by a small heat press machine "H400-15" manufactured by AS ONE Corporation to produce a test sample.

After stored at room temperature (23° C.) for 30 minutes, the test sample was cut into a piece of 25 mm width and 150 mm length, and the release force of the cut-out sample was measured at a release rate of 50 mm/min and a release angle of 180° using a precision universal testing machine (AUTO-GRAPH (registered trademark) AGS-1kNX, 50N load cell) manufactured by SHIMADZU CORPORATION, according to the method of JIS Z 0237 (2009). If the release force is approximately 1 N/25 mm, it is large enough as an initial force to complete the adhesion.

(Boiling Test)

Five pieces of samples, each having a width of 50 mm and a length of 50 mm, were cut out from test samples produced in the same way as the samples used for evaluation of the initial release force. These samples were immersed in boiling water at 98° C. or higher for 270 hours, and the degree of peeling of the adhesive layer was visually evaluated as the following four grades.

Excellent: All five sheets show no lifting, peeling, or void.

Good: Two or less out of five samples show lifting or peeling of smaller than 1 mm in length at their respective edges, but other samples show no lifting, peeling, or void. Lifting, peeling, or a void with a length of smaller than 1 mm is permissible in the bonding of a MAE sub-gasket in a high-temperature and high-humidity environment.

Moderate: Three or more out of five samples show lifting, peeling, or voids of smaller than 1 mm in length at their respective edges, but none of the samples show lifting or peeling of 1 mm or larger in length. No Examples or comparative examples were classified into this stage.

Bad: One or more out of five samples show lifting, peeling, or a void with a length of 1 mm or larger.

15

16

Test Results

Table 1 below shows the constitution and evaluation results of each sample. The contents of each component of the adhesive composition are expressed in units of parts by mass.

in the evaluation results of appearance after boiling. In particular, Examples 1, 2, and 4 to 6, in which each adhesive layer has a gel fraction of 90 mass % or higher, and a decreasing rate of the storage elastic modulus of 0.2 or less, exhibit particularly large initial release force and particularly

TABLE 1

| | | | Examples | | | | | | |
|---|---|---|---|---|---|---|---|---|---|
| | | | 1 | 2 | 3 | 4 | 5 | 6 | 7 |
| Adhesive layer | Resin (a) | <1> | 100 | 100 | 100 | 100 | 100 | 100 | 100 |
| | | <2> | | | | | | | |
| | | <3> | | | | | | | |
| | | <4> | | | | | | | |
| | | <5> | | | | | | | |
| | | <6> | | | | | | | |
| | Cross-linking agent (b) | <1> | 11.8 | 10.3 | 10.3 | 5 | | | |
| | | <2> | | | | | 11.8 | | |
| | | <3> | | | | | | 11.8 | |
| | | <4> | | | | | | | 11.8 |
| | Functional-group molar ratio (b/a) | | 3.3 | 2.9 | 2.9 | 1.4 | 5.5 | 6.8 | 6.4 |
| | Aging condition (temperature × time) | | 60° C. × 6 days | 150° C. × 30 minutes | 40° C. × 6 days | 60° C. × 6 days | 60° C. × 6 days | 60° C. × 6 days | 60° C. × 6 days |
| Storage elastic modulus [Pa] | G'$_{100}$ | | 2.6E+05 | 3.0E+05 | 1.1E+05 | 1.5E+05 | 1.6E+05 | 2.3E+05 | 2.8E+05 |
| | G'$_{120}$ | | 2.4E+05 | 2.8E+05 | 7.6E+04 | 1.4E+05 | 1.5E+05 | 2.1E+05 | 2.5E+05 |
| | Change rate (G'100-G'120)/G'100 | | 0.08 | 0.05 | 0.33 | 0.05 | 0.08 | 0.08 | 0.08 |
| | Gel traction [%] | | 92 | 94 | 85 | 94 | 93 | 90 | 96 |
| | Tg (° C.) | | 10 | 6 | −6 | −3 | 3 | −5 | −3 |
| | Initial release force [N/25 mm] | | 5.7 | 6.1 | 6.7 | 5.6 | 5.5 | 6.0 | 7.3 |
| | Appearance after boiling | | Excelent | Excellent | Good | Excellent | Excellent | Excellent | Good |

| | | | Examples | | | | Comparalive examples | | |
|---|---|---|---|---|---|---|---|---|---|
| | | | 8 | 9 | 10 | 11 | 1 | 2 | 3 |
| Adhesive layer | Resin (a) | <1> | | | | | 100 | 100 | |
| | | <2> | 100 | | | | | | |
| | | <3> | | | | | | | 100 |
| | | <4> | | 100 | | | | | |
| | | <5> | | | 100 | | | | |
| | | <6> | | | | 100 | | | |
| | Cross-linking agent (b) | <1> | 11.8 | 6.1 | 7.3 | 7.6 | 10.3 | 10.3 | |
| | | <2> | | | | | | | |
| | | <3> | | | | | | | |
| | | <4> | | | | | | | |
| | Functional-group molar ratio (b/a) | | 3.4 | 1.7 | 2.0 | 2.1 | 2.9 | 2.9 | — |
| | Aging condition (temperature × time) | | 60° C. × 6 days | 60° C. × 6 days | 60° C.× 6 days | 60° C. × 6 days | — | 40° C. × 4 days | — |
| Storage elastic modulus [Pa] | G'$_{100}$ | | 4.6E+05 | 7.1E+05 | 1.1E+06 | 2.2E+06 | 4.8E+04 | 7.2E+04 | 1.8E+09 |
| | G'$_{120}$ | | 3.6E+05 | 6.6E+05 | 8.9E+05 | 1.2E+06 | 8.9E+03 | 3.4E+04 | 1.6E+09 |
| | Change rate (G'100-G'120)/G'100 | | 0.21 | 0.08 | 0.20 | 0.44 | 0.82 | 0.53 | 0.11 |
| | Gel traction [%] | | 89 | 71 | 67 | 87 | 27 | 62 | 22 |
| | Tg (° C.) | | 50 | 74 | 84 | 89 | −9 | −13 | 137 |
| | Initial release force [N/25 mm] | | 1.2 | 2.7 | 2.4 | 2.7 | — | 69 | Unadhesable |
| | Appearance after boiling | | Excellent | Excellent | Excellent | Excellent | Bad | Bad | — |

For Examples 1 to 11, the adhesive layer of the thermosetting adhesive sheet is made of a cured product of an adhesive composition containing a polyurethane resin having a reactive functional group and a cross-linking agent; has a gel fraction of 60 mass % or higher, the storage elastic modulus at 100° C. (G'$_{100}$) of $5.0 \times 10^4$ Pa or higher and $1.0 \times 10^8$ Pa or lower; and a decreasing rate of the storage elastic modulus at 120° C. (G'$_{120}$) to the storage elastic modulus at 100° C. (G'$_{100}$) of 0.5 or less. Correspondingly, it can be understood that each adhesive sheet has excellent storage stability, adhesion can be completed by short thermos-compression bonding as shown in the evaluation results of the initial release force, and adhesion failures such as lifting, peeling, and a void can be suppressed even in a high-temperature and high-humidity environment as shown high resistance against a high-humidity and high-temperature environment. Examples 8 to 11, in which the glass transition temperature is 50° C. or higher, also exhibit high resistance against a high-temperature and high-humidity environment.

In comparative examples 1 and 2, a decreasing rate of the storage modulus exceeds 0.5. Correspondingly, the peeling of the adhesive layer was observed in the boiling test. In particular, for comparative example 1, G'$_{100}$ was under $5.0 \times 10^4$ Pa, and the gel fraction was under 60 mass %, and thus adhesiveness was bad, and therefore the initial release force was not measured. As for comparative example 3, G'$_{100}$ was over $1.0 \times 10^8$ Pa. Correspondingly, the adhesiveness of the adhesive layer was low and it could not be adhered to the solid polymer electrolyte membrane.

Although some embodiments of the invention have been described hereinbefore, the invention is by no means limited to such embodiments, and various modifications can be made without departing from the gist of the invention.

LIST OF REFERENCE SIGNS

10 Adhesive sheet
12 Base film
14 Adhesive layer
16 Second base film
W1 Opening
W2 Exposed opening
The invention claimed is:

1. A thermosetting adhesive sheet for sealing a periphery of a membrane electrode assembly, which is composed of a solid polymer electrolyte membrane and electrodes placed on both sides of the solid polymer electrolyte membrane for a fuel cell, the thermosetting adhesive sheet comprising, an adhesive layer comprising a cured product of an adhesive composition containing a polyurethane resin having a reactive functional group, and a cross-linking agent, wherein the reactive functional group contains a carboxyl group and the cross-linking agent contains a multifunctional epoxy cross-linking agent, wherein the adhesive layer has:

a gel fraction of 60 mass % or higher;

a storage elastic modulus at 100° C. ($G'_{100}$) of $5.0 \times 10^4$ Pa or higher and $1.0 \times 10^8$ Pa or lower;

a decreasing rate of a storage elastic modulus at 120° C. ($G'_{120}$) to the storage elastic modulus at 100° C. ($G'_{100}$) of 0.5 or less, and the decreasing rate is defined as $(G'_{100}-G'_{120})/G'_{100}$; and a ratio (b/a) of molar amount (a) of the carboxyl group of the polyurethane resin to molar amount (b) of the epoxy group of the multifunctional epoxy cross-linking agent is 1.3 or higher and 10.0 or lower.

2. The thermosetting adhesive sheet according to claim 1, wherein the adhesive layer has a glass transition temperature of −10° C. or higher and 100° C. or lower.

3. The thermosetting adhesive sheet according to claim 2, wherein the adhesive layer has a glass transition temperature of 50° C. or higher and 100° C. or lower.

4. The thermosetting adhesive sheet according to claim 1, wherein the adhesive layer is formed on one surface of a base film, and the base film is made of at least one resin material selected from a group consisting of polyethylene terephthalate, polyethylene naphthalate, polyamide, polyimide, polyphenylene sulfide, polysulfone, polyethersulfone, polyetheretherketone, and polyarylate.

5. The thermosetting adhesive sheet according to claim 4, further comprising a second base film on a surface of the adhesive layer opposite to the surface on which the base film is provided, wherein the second base film is made of at least one resin material selected from a group consisting of polyethylene terephthalate, polyethylene naphthalate, polyamide, polyimide, polyphenylene sulfide, polysulfone, polyethersulfone, polyetheretherketone, and polyarylate.

6. A sub-gasket for a fuel cell, comprising the thermosetting adhesive sheet according to claim 4.

7. The thermosetting adhesive sheet according to claim 1, wherein the multifunctional epoxy cross-linking agent comprises one or more selected from the group consisting of: bisphenol A epoxy resin, epichlorohydrin epoxy resin, ethylene glycidyl ether, N,N,N',N'-tetrakis(2,3-epoxypropyl)-1, 4-phenylenediamine, N,N,N',N'-tetrakis(oxiran-2-ylmethyl)-4,4'-methylenebisaniline, N,N-diglycidyl-4-(glycidyloxy)aniline, N,N,N',N'-tetraglycidyl-m-xylylenediamine, 1,1,2,2-tetrakis (3-glycidyloxyphenyl) ethane, diglycidylaniline, diamine glycidylamine, 1,3-bis (N,N-diglycidylaminomethyl) cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, glycerin diglycidyl ether, glycerin triglycidyl ether, polyglycerol polyglycidyl ether, sorbitan polyglycidyl ether, trimethylolpropane polyglycidyl ether, adipic acid diglycidyl ester, o-phthalic acid diglycidyl ester, triglycidyl-tris(2-hydroxyethyl) isocyanurate, resorcinol diglycidyl ether, and bisphenol-S-diglycidyl ether.

\* \* \* \* \*